United States Patent [19]

Koster et al.

[11] Patent Number: 4,530,973
[45] Date of Patent: Jul. 23, 1985

[54] TRANSPARENT IMPACT RESISTANT POLYMERIC COMPOSITIONS AND PROCESS FOR THE PREPARATION THEREOF

[75] Inventors: Robert A. Koster; Tom D. Traugott, both of Midland, Mich.

[73] Assignee: The Dow Chemical Company, Midland, Mich.

[21] Appl. No.: 474,613

[22] Filed: Mar. 11, 1983

[51] Int. Cl.³ .................... C08F 279/06; C08F 287/00
[52] U.S. Cl. ..................................... 525/310; 525/316
[58] Field of Search ......................................... 525/310

[56] References Cited

U.S. PATENT DOCUMENTS

| | | | |
|---|---|---|---|
| 2,843,561 | 7/1958 | Ingley | 525/310 |
| 3,029,223 | 4/1962 | Hibbard | 525/310 |
| 3,267,178 | 8/1966 | Lee | 525/310 |
| 3,400,175 | 9/1968 | Finestone | 260/880 |
| 3,509,237 | 4/1970 | Aubrey | 525/71 |
| 3,981,944 | 9/1976 | Okamoto | 525/310 |
| 4,080,406 | 3/1978 | Kelsey | 525/310 |
| 4,097,555 | 6/1978 | Moran | 525/310 |
| 4,100,228 | 7/1978 | Dennis | 525/310 |
| 4,221,883 | 9/1980 | Mott | 525/243 |
| 4,230,833 | 10/1980 | Puris | 525/310 |
| 4,287,317 | 9/1981 | Kitagawa | 525/310 |
| 4,308,354 | 12/1981 | Jung | 525/310 |
| 4,330,641 | 5/1982 | Echte | 525/310 |

*Primary Examiner*—John C. Bleutge
*Assistant Examiner*—Patricia Short
*Attorney, Agent, or Firm*—Jonathan W. Morse; Tom J. Mielke

[57] ABSTRACT

Impact-resistant transparent polymeric compositions are prepared comprising particulate diene-monovinylidene aromatic block copolymer elastomer dispersed in a matrix comprising polymerized monovinylidene aromatic and acrylate monomers. These compositions can be advantageously prepared by adding the elastomeric block copolymer to an agitated polymerization system at a point where the elastomer will become dispersed as particles immediately or nearly immediately after addition.

12 Claims, No Drawings

TRANSPARENT IMPACT RESISTANT POLYMERIC COMPOSITIONS AND PROCESS FOR THE PREPARATION THEREOF

The present invention concerns transparent polymeric compositions having good impact resistance and a process for their preparation. In this composition, particles of an elastomeric diene block copolymer are dispersed in a matrix copolymer of monovinylidene aromatic and acrylate monomers. The composition of the matrix polymer in terms of the proportions of the two monomers is achieved so that the refractive index of the resultant matrix polymer is approximately the same as the refractive index of the elastomeric diene block copolymer which is reinforcing the matrix polymer. An average particle size in the dispersed particulate elastomer is achieved which provides improved impact resistance. The process according to the present invention is a particularly advantageous method to achieve the desired average particle size and improved impact resistance.

Various processes for making rubber-modified monovinylidene aromatic-acrylate copolymer compositions are known in the art. See, for example, U.S. Pat. Nos. 2,843,561; 3,029,223; and 3,267,178 which are incorporated herein by reference. U.S. Pat. Nos. 2,843,561 and 3,029,223 teach a process for preparing polymer compositions by dispersing or dissolving styrene-butadiene copolymer rubber in a mixture of acrylate and monovinylidene aromatic monomers and then polymerizing the monomers to form a transparent polymer composition, the resultant compositions having only fair impact resistance. U.S. Pat. No. 3,267,178 teaches a process for preparing polymer compositions by (a) dissolving or dispersing butadiene rubbers in acrylate, monovinylidene aromatic and optional additional monomers, (b) partially polymerizing the monomers and (c) dispersing the resultant partial polymer in an inert aqueous medium and heating to substantially completely polymerize the monomer. Though somewhat improved impact resistances are achieved according to the teachings of this patent, the process which is taught uses an aqueous dispersion step. This step in turn requires that substantial water treatment and purification measures be taken before recycling and/or discharging the water used in such a step. Moreover, according to the teachings of this patent relatively large amounts of the expensive acrylate monomer are required, making the resultant product more expensive.

According to the present invention transparent polymeric compositions are prepared which have improved combinations of cost and impact resistance. Moreover, an improved polymerization process for preparing transparent, impact resistant polymeric compositions is provided which does not require an aqueous dispersion step.

In one aspect, the present invention is a process for preparing transparent polymeric compositions wherein a feed stream comprising an elastomeric diene-monovinylidene aromatic block copolymer is added to an agitated polymerization system, in which polymerization system there is a reaction mixture comprising one or more monovinylidene aromatic monomers and one or more acrylate monomers which are being polymerized, the elastomer feed stream addition being to a point in the polymerization system where the added block copolymer is dispersed as discrete particles in the reaction mixture.

In another aspect, the present invention is a transparent polymeric composition comprising matrix polymer and dispersed occlusion-containing particles of diene-monovinylidene aromatic block copolymer elastomer wherein:

(A) the matrix polymer comprises polymerized therein from about 40 to about 60 percent monovinylidene aromatic monomer by weight and from about 60 to about 40 percent by weight acrylate monomer, both percents by weight being based on the weight of monovinylidene aromatic and acrylate monomers in the matrix polymer, and (B) the dispersed particulate elastomer makes up from about 4 to about 20 percent by weight of the transparent polymeric composition.

Matrix compositions according to the present invention comprise, in polymeric form, monovinylidene aromatic and acrylate monomers. Preferably, the matrix polymer compositions according to the present invention contain no acrylonitrile or other similar monomers which would generally prevent such polymers from being used in some applications due to monomer residuals. More preferably the matrix compositions are copolymers consisting essentially of monovinylidene aromatic and acrylate monomers.

By the term monovinylidene monomer as used herein is meant a monovinylidene aromatic compound having the general formula:

Formula I wherein Ar represents an aromatic hydrocarbon radical of the benzene or naphtha series and R is hydrogen or an alkyl radical having from 1 to 3 carbons. Examples of such monovinylidene aromatic monomers are styrene, α-methylstyrene, para-methylstyrene and the like. Styrene is the preferred monovinylidene aromatic monomer.

Also required for the matrix composition is an acrylate monomer. By the term acrylate monomer is meant an acrylate compound having the general formula:

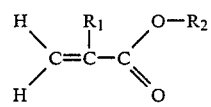

Formula II wherein $R_1$ represents H or $CH_3$ and $R_2$ represents an alkyl radical having from 1 to 12 carbon atoms, preferably 1 to 4 carbon atoms. Examples of such acrylate monomers are methyl acrylate, ethyl acrylate, butyl acrylate, methyl methacrylate, ethyl methacrylate, butyl methacrylate and the like. Methyl methacrylate is the preferred acrylate monomer.

In order to prepare a transparent polymeric composition, the above-described monomers are employed in amounts such that the refractive index of the matrix composition matches the refractive index of the elastomeric diene block copolymer. As is known in the art, the refractive indexes of both the matrix composition and the reinforcing block copolymer can be roughly calculated knowing the composition of each. Starting with conditions that will produce rubber-modified compositions according to the rough calculations based on a given diene block copolymer composition, transparency can then be optimized by slight adjustments in the amounts of monovinylidene aromatic and/or acrylate monomers polymerized into the matrix composition.

In general, it is desirable for the matrix polymer in the transparent polymeric compositions according to the present invention to comprise from about 30 to about 60 percent by weight monovinylidene aromatic monomer, based on the weight of monovinylidene aromatic and acrylate monomers in the matrix composition. Preferably, such matrix compositions comprise from about 40 to about 60 percent by weight monovinylidene aromatic monomer, most preferably from about 40 to about 50 percent by weight. The matrix compositions, in addition, generally comprise from about 70 to about 40 percent by weight acrylate monomer based on the weight of monovinylidene aromatic and acrylate monomers in the matrix composition, preferably from about 60 to about 40 percent by weight and most preferably from about 60 to about 50 percent by weight acrylate monomer for the best combinations of cost and transparency. Minor amounts of other monomers in polymerized form may also be included in the matrix polymers according to the present invention. Preferably, however, the matrix polymer consists essentially of monovinylidene aromatic and acrylate monomers, most preferably consisting entirely of such monomers.

It has been found that for optimized strength properties, the monovinylidene aromatic-acrylate matrix copolymer should have a weight average molecular weight as measured using polystyrene standards of from about 100,000 to about 300,000, preferably from about 120,000 to about 200,000. Desirably, the molecular weight distribution will be relatively narrow, the ratio of the weight average molecular weight to the number average molecular weight (Mw/Mn) being from about 2 to about 3, preferably from about 2 to about 2.4.

The diene-monovinylidene aromatic block copolymer elastomeric compositions or rubbers suitable for use according to the present invention include linear stereospecific block diene copolymers having a block of polymerized monovinylidene aromatic monomer and a block of polymerized conjugated diene monomer. Such block copolymers can have the general formula A-B, or A-B-A, wherein A is a polymerized monovinylidene aromatic monomer block and B is a polymerized conjugated diene monomeric block. As is well known, such "blocks" can consist of only one monomeric unit or they can be of the so-called "tapered block" structure. In the latter case a block consists primarily of one type of monomeric unit but at the point or points where the blocks meet the copolymer composition ranges from primarily monovinylidene aromatic units in the "A" block, through a nearly 50—50 composition, to primarily diene monomer units in a "B" block.

Generally, the A block has a molecular weight averaging from about 5,000 to about 60,000, whereas the B block has a molecular weight averaging from about 60,000 to about 500,000. The molecular weight of the elastomeric diene block copolymer is preferably from about 100,000 to about 200,000. The elastomeric diene block copolymer generally comprises at least about 55 percent by weight, preferably 65 to 90 percent by weight, of the polymerized conjugated diene monomer and at least about 10 percent by weight, preferably from about 10 to 35 percent by weight of the polymerized monovinylidene aromatic monomer. Such block copolymers are usually prepared in hydrocarbon solution using alkali metal organo catalysts, such as the well-known alkyl lithium catalysts. Methods for the preparation of such compositions are well known in the art. See, for example, U.S. Pat. No. 3,485,894 which is incorporated herein by reference.

The diene block copolymer elastomer or rubber is present in the transparent polymeric compositions according to the present invention in the form of large, grafted, occlusion-containing particles dispersed homogeneously or nearly homogeneously throughout the matrix polymer. Grafted to and occluded within such block copolymer particles are amounts of polymer having a composition similar or identical to that of the matrix composition. When transparent polymeric compositions are prepared according to the process of the present invention, this grafted and occluded polymer is nearly identical in composition to the matrix monovinylidene aromatic-acrylate copolymer, as is preferred. By the term "large" it is meant that these grafted, occlusion-containing particles generally have a volume average diameter of at least about 1 micron, preferably from about 2 to about 5 microns, more preferably from about 3 to about 4 microns. Average particle size can conveniently be determined using transmission electron micrographs.

In another aspect of the present invention, there are also present in the transparent polymeric compositions, in addition to the group of large block copolymer particles, a second group of elastomeric particles preferably similar or identical in composition and structure to the aforementioned large particles. If present, this second group of particles would have a smaller volume average diameter than the above-mentioned large elastomer particles.

In general, the transparent polymeric compositions according to the present invention comprise from about 4 to about 20 weight percent elastomer which weight percent would include both the group of large particles and the group of small particles when they are present. When the group of smaller particles is present in addition to the required group of large particles, the group of large particles should make up at least about 15 weight percent of the rubber in the transparent polymeric composition, preferably about 15 to 50 weight percent of the rubber and more preferably about 20 to 30 weight percent. The weight percent of the elastomer in the transparent polymeric composition is based on the total weight of the elastomer-modified transparent polymeric composition including elastomer, matrix polymer and the polymer which is grafted to and occluded within the elastomer particles. The weight of the elastomer in this weight percent calculation includes only the weight of the elastomeric material and does not, for the purpose of this calculation, include the weight of the matrix-type polymer which is grafted to and occluded within the elastomer particles. Preferably, the transparent polymeric compositions according to the present invention contain from about 5 to about 15 percent by weight elastomeric diene block copolymer.

The process aspect of the present invention solves several problems that were encountered in trying to make transparent polymeric compositions according to the techniques taught in the prior art. As is well known, elastomeric diene block copolymers can provide impact resistance in rubber-modified polymer compositions. In addition, these copolymers have a relatively high refractive index as compared to diene homopolymer rubbers and, therefore, less of the expensive acrylate monomer is required to be polymerized into the matrix composition in order to match the refractive index of the matrix with the refractive index of the rubber phase and provide a transparent composition. It was found, however, that when attempts were made to incorporate such elastomeric diene block copolymers into the rubber-modified polymers by the processes taught in the art, in which processes monomers having rubber dissolved therein were polymerized, insufficient impact resistance was achieved by those processes. It was noted that when the block copolymers were dissolved in the monovinylidene aromatic and acrylate monomers and polymerization initiated, the dispersed rubber particles that were formed were very small. The process according to the present invention is able to produce particles that are substantially larger and allows the production of transparent polymeric compositions having improved impact resistance when compared to similar compositions according to the prior art. Moreover, this is accomplished without the necessity of an aqueous dispersion step.

The essence of the process aspect of the present invention, is to supply elastomeric diene block copolymer to a point in the polymerization system where the added block copolymer will be dispersed as particles. The prior art teaches the solution of the rubber in monomer and the provision of the rubber-monomer solution to the beginning point of a polymerization system, especially when transparent polymeric compositions are prepared. All or part of the rubber is supplied according to the present invention to the reaction zone at a point after substantial polymerization of the matrix polymer has occurred. It has been found to be critical in achieving good impact resistance in the present compositions to add block copolymer to the reaction mixture at a point in the reaction zone where a sufficient amount of monomer has polymerized so that when the block copolymer is added to the reaction zone, it is dispersed as discrete particles in the reaction mixture. If an insufficient amount of the monomer in the reaction zone has been polymerized when the rubber is added, the rubber will merely dissolve in the unpolymerized monomer in the continuous phase. If the added block copolymer merely dissolves in the continuous phase, then later, after more monomer has polymerized, the dissolved rubber will become dispersed as small particles and not the desired large particles. As is well known, rubber which is dissolved in the original feed monomer starts out in the larger-volume, continuous phase. As polymer is formed, it forms a phase which is incompatible with the continuous rubber-monomer phase which polymer-containing phase increases in volume until the rubber-containing phase becomes dispersed as particles by the well-known process of phase inversion. Though rubber is added after polymerization has started, the point of rubber addition in the process according to the present invention is chosen so that the added rubber has sufficient residence time under polymerization conditions to become grafted with amounts of the matrix polymer composition and to have amounts of such matrix polymer form as occlusions within the block copolymer particles.

It is preferred that this rubber which is added to the reaction mixture be dissolved in an amount of a solvent or diluent which can be monovinylidene aromatic and-/or acrylate monomer and/or a nonreactive solvent. As used herein "nonreactive solvents" include liquid materials which are generally non-reactive under polymerization conditions and are solvents or diluents for the polymer produced. Such materials include dimethylformamide, acetone, methyl ethyl ketone, ethyl benzene, toluene, xylenes and the like.

The design of the agitated polymerization system to which the elastomeric block copolymer is added is not particularly critical so long as the polymerization system used is able to provide the proper amount of mixing to the reaction mixture. It is important, however, that the polymerization system be designed such that a feed stream comprising an elastomeric diene-monovinylidene aromatic block copolymer can be added to an agitated reaction mixture comprising monovinyliene aromatic and acrylate monomers which are being polymerized. In one aspect of the present invention, this reaction mixture consists essentially of monovinylidene aromatic and acrylate monomers and the polymerization product thereof plus optional nonreactive solvent or diluent. In another aspect, it also contains amounts of elastomer which were added earlier or dissolved in initially supplied monomer feed.

The addition must be made at a point in the polymerization system or process where the added block copolymer will be immediately or nearly immediately dispersed as discrete particles (i.e., become a discontinuous phase or part of an existing discontinuous phase) in the reaction mixture rather than being dissolved in a continuous phase. The fact that the block copolymer must become dispersed means that it must be incompatible or insoluble in the continuous phase which is present at the point in the polymerization system where the block copolymer is added. Moreover, it means that the combination of the added block copolymer feed stream with the volume of any other discontinuous phase present in the polymerization system, which other discontinuous phase is compatible or soluble with the added block copolymer, cannot cause phase "re-inversion" whereby the volume of the phase containing the added block copolymer is such that it becomes the continuous phase. If the added block copolymer becomes dissolved in or otherwise part of the continuous phase present in the polymerization system and the block copolymer is later dispersed as particles, the particles that are formed in this manner are generally not large enough to provide optimized impact resistance in the resultant transparent polymeric composition.

In general, for the added block copolymer to be incompatible with or insoluble in the continuous phase and thereby dispersed as particles at the point in the polymerization system where the block copolymer is added, it is necessary that the monomers which have been supplied to the polymerization system be sufficiently converted to polymer. The exact amount of conversion that needs to have taken place depends on many factors including the amount and nature of any non-reactive solvents used and presence of any elastomeric polymer which may have been added earlier. This degree of conversion can be experimentally determined for the various polymerization systems used and for the various transparent polymeric compositions prepared according to the present invention.

Included among the various types of polymerization systems which can be used in the practice of the present invention are the continuous plug flow type, the continuous stirred tank type and the batch type, as well as various modifications and combinations of these.

The polymerization process of the present invention can be advantageously done in an agitated plug-flow reactor system. When this type of reactor system is used, the reaction mixture present in the agitated polymerization system at the point where the elastomeric block copolymer is being added is prepared by providing to the beginning of an agitated, plug-flow polymerization system from about 15 to about 40 parts by weight monovinylidene aromatic monomer and from about 30 to about 70 parts by weight acrylate monomer. The provided monomers are polymerized under an effective amount of shearing agitation to provide the desired reaction mixture. Preferably, up to about 30 parts by weight of a nonreactive solvent are also provided to the beginning of the polymerization system, most preferably about 10 to 20 parts by weight.

The plug flow reactor system can consist of one reactor or more than one reactor connected in series as long as reactants are fed or supplied to a beginning point in the reactor system and proceed under reaction or polymerization conditions through the reactor system and are continuously removed at the end of the reactor system. In other words, there is substantially no backmixing in this type of reactor system. There is required to be, however, good mixing in the form of shearing agitation in the cross-sectional direction. When this type of polymerization is used, the elastomeric diene block copolymer is added to the reactor system at a point where there has been sufficient conversion and there is sufficient shearing agitation that the block copolymer is dispersed into particles of the desired size soon after addition. The specific type of agitator, the rate of agitation, the length of the polymerization zone and the other specific polymerization conditions can vary from one reactor to another.

In order to incorporate increased amounts of rubber in the transparent polymeric composition and for various other reasons, it may also be desired in the practice of the present invention to supply some rubber to the plug flow polymerization system at the beginning point of the process. See for example, U.S. Pat. No. 4,221,883 which is incorporated herein by reference. In this aspect of the present invention it has been found very advantageous to supply this rubber to the beginning of the polymerization zone in solution in one or both of the monomers which are supplied and/or a nonreactive solvent. It has been found very advantageous to prepare a solution comprising from about 5 to about 20 parts of an elastomeric diene block copolymer, from about 15 to about 40 parts by weight monovinylidene aromatic monomer, from about 30 to about 70 parts by weight acrylate monomer and from about 10 to about 20 parts by weight non-reactive solvent. This mixture is then divided, a first portion being supplied to the beginning of the polymerization system and a second portion being supplied to the polymerization system at a point where a sufficient amount of the earlier-supplied monomer has polymerized so that the added block copolymer upon addition to the reaction mixture is dispersed as discrete particles of block copolymer in the reaction mixture. It should be noted that the rubber in the first portion will already have been dispersed by the process of phase inversion before the second portion is added.

In this embodiment of the present invention, it is preferable that at least about 15 percent of the rubber/monomer solution be supplied to the reaction mixture after the rubber present in the first portion of the reaction mixture has undergone phase inversion and at a point where such addition will not result in phase re-inversion. It is more preferable that about 15 to 50 weight percent of the solution be supplied and most preferable from a process control standpoint that about 20 to 30 weight percent be supplied after phase inversion. In this embodiment of the present invention, the separately added rubber components will generally result in the presence in the resultant transparent polymeric composition of two groups of particles, each group having a different average particle size. The rubber which is supplied to the beginning of the polymerization process will form small particles while the rubber that is added later, after phase inversion will form larger particles. It is preferred that the later addition of the rubber monomer solution produce a group of particles having a volume average diameter of at least about 1 micron, more preferably from about 2 to about 5 microns and most preferably from about 3 to about 4 microns.

Also included among the types of polymerization systems which can be used in the practice of the present invention is the continuous stirred tank type of reactor which type includes the recirculated coil reactors. See for example, U.S. Pat. Nos. 4,332,924 and 4,328,186 which are incorporated herein by reference. In this type of reactor system a reaction mass including monomers, diene block copolymer and optional non-reactive solvent is continuously supplied to an agitated back-mixed reaction zone maintained under polymerization conditions. At the same time, a portion of the reaction mixture is continuously removed from the reaction zone, from which removed portion the transparent polymeric composition is recovered. The continuous stirred tank reactor is operated under conditions such that the volume of incoming feed is about equivalent to the volume of the reaction mixture which is removed. The composition of the reaction mixture is essentially homogeneous throughout the reaction mixture. Polymerization conditions are adjusted and maintained such that the average percentage of polymerized monomers in the reaction mixture stays about the same and is at a level such that the diene block copolymer which is added to the polymerization system is dispersed as particles in the reaction mixture. In this way, block copolymer particles of the desired size are obtained and very good impact resistance is achieved.

In addition to the polymerization methods described above, several other factors have been found to improve the impact resistance of the transparent polymeric compositions according to the present invention. Among other things, it has been found very important to provide to the polymerization system, preferably the beginning of the polymerization system, an amount of a chain transfer agent. This is especially important in the embodiment of the present invention where rubber is being provided to the beginning of a plug flow polymerization system. The various chain transfer agents suitable for use according to the present invention are well known in the art. Exemplary chain transfer agents include α-methylstyrene dimer and the alkyl mercaptan chain transfer agents, such as n-dodecyl mercaptan. The mercaptan chain transfer agents are especially preferred, it being very desirable to add from about 0.02 to about 0.2 parts by weight of a mercaptan chain transfer agent per hundred weight parts of reaction mixture including monomers, solvent and dissolved rubber, more preferably from about 0.03 to about 0.1 parts by weight of a mercaptan chain transfer agent and most preferably from about 0.03 to about 0.05 parts by weight. N-dodecyl mercaptan has been found to be especially effective when used in these amounts.

The use of a free radical generating polymerization initiator and the type and concentration of such initiator have also been found to be important in the practice of the present invention. It has been found desirable in the practice of the present invention to add a free radical generating polymerization initiator with the monomer feed stream or streams to the beginning of the polymerization zone and especially desirable when rubber is supplied to the beginning of a plug flow polymerization system. Free radical generating polymerization initiators are well known in the art. Examples of such initiators include mono- or di-hydroperoxy-type initiators such as t-butyl hydroperoxide, and the preferred mono- or ditertiarybutylperoxy-type initiators such as ditertiarybutylperoxy-1,1-cyclohexane. In general, it has been found desirable to provide from about 0.01 to about 0.1 parts by weight of a free radical generating polymerization initiator per hundred parts of reaction mixture to the beginning of the polymerization zone. More preferably from about 0.01 to about 0.05 parts by weight, most preferably from about 0.02 to about 0.04 parts by weight are provided. It has been found that ditertiarybutylperoxy-1,1-cyclohexane is a very suitable initiator when used in these amounts.

Though not necessary for the practice of the present invention, it may be desirable in some types of polymerization systems to disperse or suspend the reaction mixture, after the point of rubber addition, in an aqueous phase for the completion of monomer polymerization.

The degree of agitation of the reaction mixture needs to be adjusted to optimize the impact resistance of the resultant transparent polymeric compositions. Insofar as agitation is concerned, it has been found desirable, in general, to have a relatively high degree of agitation during the early stages of plug flow or batch polymerization processes and then to reduce the amount of agitation of the reaction mixture at or about the point at which the large or larger particles of block copolymer are being formed and to maintain reduced agitation of the reaction system after that point. While sufficient agitation is required in the earlier stages of plug flow or batch polymerization in order to provide sufficient mixing of the monomers and sufficient heat transfer, it has been found desirable to minimize the amount of agitation that is supplied during and after the large or larger particles of the block copolymer are formed. In the continuous stirred tank reactor system and similar systems where the agitation is relatively constant, the proper degree of agitation can be experimentally determined to accomplish sufficient mixing and heat transfer while optimizing impact resistance. As is known, agitation or mixing can be supplied by mechanical agitation means and/or static-type mixers. The reduction in agitation can be accomplished by reducing the revolutions per minute of rotating mechanical-type agitators and/or the energy that is supplied to such agitation means. Agitation can also be reduced by the removal or adjustment of static mixing means.

The invention is further illustrated but not limited by the following examples.

EXAMPLE 1

Polymerization runs 1 through 3 are conducted in an agitated, 3-stage, plug-flow reaction zone. The reaction zone has three stirred 1.4 liter vessels or reactors connected in series, each of the vessels having a length to diameter ratio of about 4 to 1. Each vessel is equipped with a rotating agitation means. The axis of the agitator is centered down the length of the vessel and has a number of pins projecting perpendicularly which provide the shearing agitation. A rubber/monomer feed mixture is prepared which consists of 7 parts by weight SOLPRENE 308 ® rubber, a butadiene styrene (70/30) block copolymer, 31 parts by weight styrene, 43 parts by weight methyl methacrylate and 18 parts ethyl benzene. In addition the feed also contains 0.04 parts n-dodecyl mercaptan and 0.05 parts ditertiary butylperoxy-1,1-cyclohexane. The feed mixture is continuously supplied to the reactor system at a rate of 0.7 liter per hour; the addition points being the beginning of the first reactor vessel and the middle of the second reactor vessel, in the proportions shown in Table I below. The following conditions are employed:

(A) the first reactor is agitated at a rate of 45 revolutions per minute; the reaction mixture leaving the reactor contains about 30 percent solids; and the temperature profile is shown in Table I;

(B) the second reactor is agitated at the rate of 15 revolutions per minute; the reaction mixture leaving the reactor contains about 50 percent solids; and the temperature profile is shown in Table I;

(C) the third vessel has an agitator speed of 12 revolutions per minute; the reaction mixture leaving the reactor contains about 70 percent solids; and the temperature profile is shown in Table I.

The feed supplied to the reactor system has an average residence time of about 6 hours. The material discharging from the third reactor is fed to a devolatilization zone having a temperature of 240° C. and a pressure of 15 mm Hg absolute. The runs are summarized in Table I below. Run 1 in Table I below, where all of the rubber has been provided to the polymerization system at the beginning, exemplifies the prior art methods for preparing transparent polymeric compositions. The runs show that the addition of rubber to the polymerization system after substantial monomer polymerization has occurred (the degree of monomer polymerization being indicated by the weight percent of solids at the second rubber addition point) provides transparent polymeric compositions having improved impact resistance compared to transparent polymeric compositions prepared according to the teachings of the prior art. All of the compositions prepared contain about 10 percent by weight rubber and the matrix polymer composition is about 43 percent by weight styrene and about 57 percent by weight methyl methacrylate. All of the polymer compositions have good transparency.

TABLE I

| Run No. | Temperature Profile ||||||Feed Stream Split||| |
|---|---|---|---|---|---|---|---|---|---|---|
| | 1st Reactor || 2nd Reactor || 3rd Reactor || Weight % Total Feed Supplied to Beginning of First Reactor | Weight % Total Feed Supplied to Second Reactor | Approx. % Solids at Point of Second Feed Addition in Second Reactor | Izod* |
| | Inlet Temp | Discharge Temp | Inlet Temp | Discharge Temp | Inlet Temp | Discharge Temp | | | | |
| 1 | 102 | 108 | 128 | 132 | 140 | 150 | 100 | 0 | — | 0.47 |
| 2 | 96 | 101 | 131 | 132 | 145 | 149 | 75 | 25 | 30 | 1.90 |
| 3 | 97 | 103 | 133 | 134 | 152 | 151 | 50 | 50 | 40 | 2.12 |

*Notched Izod impact strength determined according to American Society for Testing Materials (ASTM) Test Method D-256 in foot pounds per inch notch.

EXAMPLE 2

Six polymerization runs are conducted under the conditions described in Example 1 Run 2 varying the amount of mercaptan chain transfer agent which is used and the temperature profile. This example illustrates the effect of the chain transfer agent. For these runs the first reactor has an inlet temperature of 103° C. and a discharge temperature of 114° C., the second reactor has an inlet temperature 126° C. and a discharge temperature of 131° C. and the third reactor has an inlet temperature of 158° C. and a discharge temperature of 174° C.

TABLE II

| Run No. | Mercaptan Concentration in Feed (pph)[1] | Izod[2] | MFR[3] |
|---|---|---|---|
| 4 | 0 | 0.73 | 0.57 |
| 5 | 0.02 | 0.94 | 0.59 |
| 6 | 0.03 | 1.77 | 0.75 |
| 7 | 0.04 | 1.76 | 1.09 |
| 8 | 0.05 | 1.75 | 1.10 |
| 9 | 0.06 | 1.93 | 1.27 |

[1] Parts by weight n-dodecylmercaptan per hundred weight parts feed stream.
[2] Notched Izod impact strength determined according to American Society for Testing Materials (ASTM) Test Method D-256 in foot pounds per inch notch.
[3] Melt flow rate determined according to ASTM D-1238 under Condition G in grams per 10 minutes.

EXAMPLE 3

Four polymerization runs are conducted under the conditions as described in Example 2 except that the agitation profile is changed to determine its effect. Table III shows the effect when the degree of agitation is changed in each of the three reaction vessels. Runs 12 and 13 of Table III show the importance of reducing the agitation of the reaction mixture after the rubber is added to system containing polymerized monomers. When the agitation in the third reactor vessel was too high (Run 13) the impact resistance was very poor.

TABLE III

| Run No. | Agitation Profile ||| Izod* |
|---|---|---|---|---|
| | RPM of Agitator in First Reactor Vessel | RPM of Agitator in Second Reactor Vessel | RPM of Agitator in Third Reactor Vessel | |
| 10 | 45 | 14 | 12 | 1.80 |
| 11 | 75 | 13 | 12 | 1.79 |
| 12 | 45 | 30 | 10 | 1.82 |
| 13 | 45 | 14 | 28 | 1.15 |

*Notched Izod impact strength determined according to American Society for Testing Materials (ASTM) Test Method D-256 in foot pounds per inch notch.

EXAMPLE 4

Five polymerization runs are conducted under the conditions as described in Run 2 of Example 1 varying the initiator concentration. The temperature profiles are adjusted slightly to maintain constant conversion and flow throughout the entire system. These runs in Table IV below show the effect of varying the amount of initiator which is used.

TABLE IV

| Run No. | Temperature Profile |||||| Initiator Concentration (pph)* | Izod** |
|---|---|---|---|---|---|---|---|---|
| | 1st Reactor || 2nd Reactor || 3rd Reactor || | |
| | Inlet Temp | Discharge Temp | Inlet Temp | Discharge Temp | Inlet Temp | Discharge Temp | | |
| 14 | 127 | 148 | 150 | 158 | 149 | 182 | 0 | 1.12 |
| 15 | 108 | 121 | 131 | 136 | 141 | 182 | 0.02 | 2.09 |
| 16 | 103 | 115 | 127 | 130 | 150 | 182 | 0.04 | 1.83 |
| 17 | 99 | 111 | 121 | 126 | 155 | 170 | 0.06 | 1.14 |
| 18 | 97 | 110 | 119 | 123 | 157 | 171 | 0.08 | 1.06 |

*Parts ditertiarybutylperoxy-1,1-cyclohexane initiator per hundred weight parts feed stream.
**Notched Izod impact strength determined according to American Society for Testing Material (ASTM) Test Method D-256 in foot pounds per inch notch.

As is apparent from the foregoing specification including the above examples, the present invention is susceptible of being embodied with various alterations and modifications which may differ particularly from those that have been described above. For this reason, it is to be fully understood that all of the foregoing is intended to be merely illustrative and is not to be construed or interpreted as being restrictive or otherwise limiting the present invention.

What is claimed is:

1. A process for preparing transparent polymeric compositions comprising (i) a matrix polymer consisting essentially of from greater than about 40 to about 50 percent by weight monovinylidene aromatic monomer and from about 50 to about 60 percent by weight acrylate monomer copolymerized therein, both percents by weight being based on the weight of monovinylidene aromatic and acrylate monomers in the matrix polymer and (ii) dispersed occlusion-containing particles of diene-monovinylidene aromatic block copolymer, in which process a feed stream comprising an elastomeric diene-monovinylidene aromatic block copolymer which is dissolved in a solvent solution is added to an agitated polymerization system, in which polymerization system there is a reaction mixture comprising one or more monovinylidene aromatic monomers and one or more acrylate monomers which are being polymerized, said reaction mixture being prepared by (a) providing to the beginning of an agitated plug-flow polymerization system from about 15 to about 40 parts by weight monovinylidene aromatic monomer, from about 30 to about 70 parts by weight acrylate monomer and from about 0.02 to about 0.2 part by weight of a mercaptan chain transfer agent; and (b) polymerizing the monomers provided under an effective amount of shearing agitation to provide the desired reaction mixture, the elastomer feed stream addition being to a point in the polymerization system where the added block copolymer is dispersed as discrete particles in the reaction mixture, such particles having a volume average particle diameter of from about 2 to about 5 microns.

2. A process according to claim 1 wherein from about 10 to about 20 parts by weiqht non-reactive solvent are also provided in step (a).

3. A process according to claim 1 wherein a feed stream composition is prepared comprising from about 15 to about 40 parts by weight monovinylidene aromatic monomer, from about 30 to about 70 parts by weight acrylate monomer, from about 5 to about 20 parts by weight elastomeric block copolymer and from 10 to about 20 parts by weight non-reactive solvent and divided into two portions, a first portion of the feed stream composition being provided to the beginning of the agitated plug-flow polymerization system and a second portion being added to the system at a point where the added block copolymer is dispersed as discrete particles in the reaction mixture.

4. A process according to claim 3 wherein the ratio of the amount of feed stream composition provided to the beginning of the system to the amount of feed stream composition added later to the system and dispersed as particles is from about 50:50 to about 85:15.

5. A process according to claim 4 wherein the ratio of the amount of feed stream composition provided to the beginning of the system to the amount of feed stream composition added later to the system and dispersed as particles is from about 70:30 to about 80:20.

6. A process according to claim 1 wherein the mercaptan chain transfer agent is n-dodecyl mercaptan.

7. A process according to claim 3 wherein from about 0.005 to about 0.06 part by weight of a free-radical generating polymerization initiator is provided to the beginning of the reaction zone.

8. A process according to claim 7 wherein the initiator is a di-tertiarybutylperoxy-type initiator.

9. A process according to claim 8 wherein from about 0.01 to about 0.04 part by weight of the initiator is provided.

10. A process according to claim 9 wherein the initiator is di-tertiarybutylperoxy-1,1-cyclohexane.

11. A process according to claim 8 wherein from about 0.01 to about 0.05 part by weight of di-tertiarybutylperoxy-1,1-cyclohexane is provided.

12. A process according to claim 1 wherein the elastomeric diene block copolymer added forms particles having a volume average particle diameter of from about 3 to about 4 microns in the resultant transparent polymeric composition.

* * * * *